(12) United States Patent
Chen et al.

(10) Patent No.: US 9,552,196 B2
(45) Date of Patent: *Jan. 24, 2017

(54) SCHEDULERS WITH LOAD-STORE QUEUE AWARENESS

(71) Applicant: International Business Machines Corporation, Armonk, NY (US)

(72) Inventors: Tong Chen, Yorktown Heights, NY (US); Alexandre E. Eichenberger, Chappaqua, NY (US); Arpith C. Jacob, Dobbs Ferry, NY (US); Zehra N. Sura, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,051

(22) Filed: Jun. 19, 2015

(65) Prior Publication Data

US 2016/0283212 A1     Sep. 29, 2016

Related U.S. Application Data

(63) Continuation of application No. 14/669,472, filed on Mar. 26, 2015.

(51) Int. Cl.
  *G06F 9/38* (2006.01)
  *G06F 9/30* (2006.01)
  *G06F 9/45* (2006.01)

(52) U.S. Cl.
  CPC .................. *G06F 8/4434* (2013.01)

(58) Field of Classification Search
  None
  See application file for complete search history.

(56) References Cited

U.S. PATENT DOCUMENTS

| | | | | |
|---|---|---|---|---|
| 5,555,432 A * | 9/1996 | Hinton | ............... | G06F 9/30145 712/216 |
| 6,035,389 A * | 3/2000 | Grochowski | ......... | G06F 9/3836 712/215 |
| 6,389,529 B1 * | 5/2002 | Arimilli | ............... | G06F 9/3824 711/137 |
| 6,918,111 B1 * | 7/2005 | Damron | ............... | G06F 8/4442 712/200 |
| 2004/0199731 A1 * | 10/2004 | Sprangle | ............... | G06F 13/161 711/154 |

(Continued)

OTHER PUBLICATIONS

List of IBM Patents or Patent Applications Treated as Related; (Appendix P), Filed Aug. 23, 2015; 2 pages.

(Continued)

*Primary Examiner* — Chat Do
*Assistant Examiner* — Douglas Slachta
(74) *Attorney, Agent, or Firm* — Cantor Colburn LLP

(57) ABSTRACT

In one embodiment, a computer-implemented method includes tracking a size of a load-store queue (LSQ) during compile time of a program. The size of the LSQ is time-varying and indicates how many memory access instructions of the program are on the LSQ. The method further includes scheduling, by a computer processor, a plurality of memory access instructions of the program based on the size of the LSQ.

4 Claims, 5 Drawing Sheets

(56) References Cited

U.S. PATENT DOCUMENTS

| | | | | |
|---|---|---|---|---|
| 2006/0107267 A1* | 5/2006 | Miyachi | ............... | G06F 17/505 |
| | | | | 718/100 |
| 2008/0114970 A1* | 5/2008 | Colavin | ............. | G06F 9/30076 |
| | | | | 712/226 |
| 2009/0260014 A1* | 10/2009 | Cameron | ............... | G06F 9/505 |
| | | | | 718/104 |
| 2012/0117362 A1* | 5/2012 | Bhargava | ............. | G06F 9/3848 |
| | | | | 712/239 |

OTHER PUBLICATIONS

Tong Chen, et al., "Schedulers With Load-Store Queue Awareness", U.S. Appl. No. 14/669,472, filed Mar. 26, 2015.

* cited by examiner

SCHEDULERS WITH LOAD-STORE QUEUE AWARENESS

DOMESTIC PRIORITY

This application is a continuation of U.S. patent application Ser. No. 14/669,472, filed Mar. 26, 2015, the disclosure of which is incorporated by reference herein in its entirety.

STATEMENT REGARDING FEDERALLY SPONSORED RESEARCH OR DEVELOPMENT

This invention was made with Government support under B599858 awarded by Department of Energy. The Government has certain rights to this invention.

BACKGROUND

Various embodiments of this disclosure relate to compile-time schedulers and, more particularly, to compile-time schedulers with load-store queue awareness.

In executing a program, a processor core may need to perform an ordered sequence of arithmetic instructions and memory access instructions. Generally, performing a memory access instruction can take two or more orders of magnitude more time than an arithmetic operation. The specific order of this sequence may be determined by a compiler that converted the program into code executable by the processor.

A load-store queue (LSQ) is a shared queue used by one or more processor cores of a computer processor, where each core inserts memory access instructions into the LSQ during execution of a program. Generally, the LSQ is a first-in-first-out (FIFO) queue, such that memory access instructions are handled in the order they are received at the LSQ. When a memory access instruction is handled, the desired memory addresses are accessed and the retrieved data is returned to the requesting processor core.

The LSQ has a finite capacity and thus has the potential to become full. When the LSQ is full, subsequent memory access instructions from a processor core are forced to stall. In the case of an in-order core, even arithmetic operations that are memory-independent and otherwise ready to execute will stall if they are scheduled for execution after the memory access instruction causing the stall.

SUMMARY

In one embodiment of this disclosure, a computer-implemented method includes tracking a size of a load-store queue (LSQ) during compile time of a program. The size of the LSQ is time-varying and indicates how many memory access instructions of the program are on the LSQ. The method further includes scheduling, by a computer processor, a plurality of memory access instructions of the program based on the size of the LSQ.

In another embodiment, a system includes a memory having computer readable instructions and one or more processors for executing the computer readable instructions. The computer readable instructions include tracking a size of a load-store queue (LSQ) during compile time of a program. The size of the LSQ is time-varying and indicates how many memory access instructions of the program are on the LSQ. The computer readable instructions further include scheduling a plurality of memory access instructions of the program based on the size of the LSQ.

In yet another embodiment, a computer program product for scheduling instructions includes a computer readable storage medium having program instructions embodied therewith. The program instructions are executable by a processor to cause the processor to perform a method. The method includes tracking a size of a load-store queue (LSQ) during compile time of a program. The size of the LSQ is time-varying and indicates how many memory access instructions of the program are on the LSQ. The method further includes scheduling a plurality of memory access instructions of the program based on the size of the LSQ.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are compile-time schedulers with load-store queue (LSQ) awareness. According to some embodiments, a scheduling system, being LSQ-aware, may improve program performance by explicitly tracking the running size of an LSQ and ordering program instructions to postpone memory access requests to minimize or reduce processor stalls.

Figure 1:
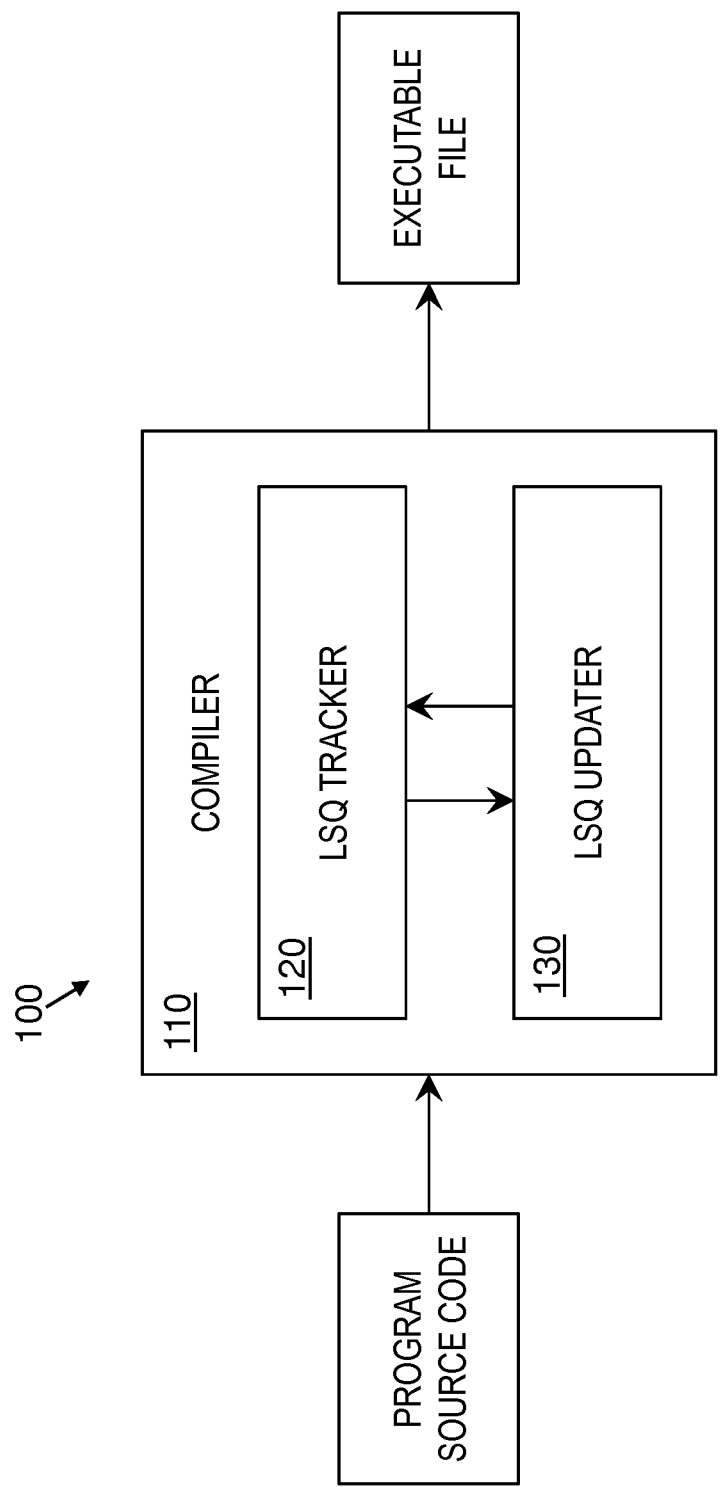
FIG. 1 is a block diagram of a scheduling system, according to some embodiments of this disclosure.

FIG. 1 is a block diagram of a scheduling system 100, according to some embodiments of this disclosure. In some embodiments, the scheduling system 100 may be integrated into a compiler 110, and may be used to schedule instructions of a program while the source code of that program is being compiled by the compiler 110. The result of the compilation may be an executable file with scheduled instructions. The scheduling system 100 may be LSQ-aware, and as shown, the scheduling system 100 may include an LSQ tracker 120 and an LSQ updater 130. In general, the LSQ tracker 120 may track the status of the LSQ to determine whether the LSQ will become overused if instructions are added at various times; and the LSQ updater 130 may update the time-varying status of the LSQ 130 based on instructions having been newly scheduled. These aspects of the scheduling system 100 will be described in more detail later in this disclosure.

Figure 2:
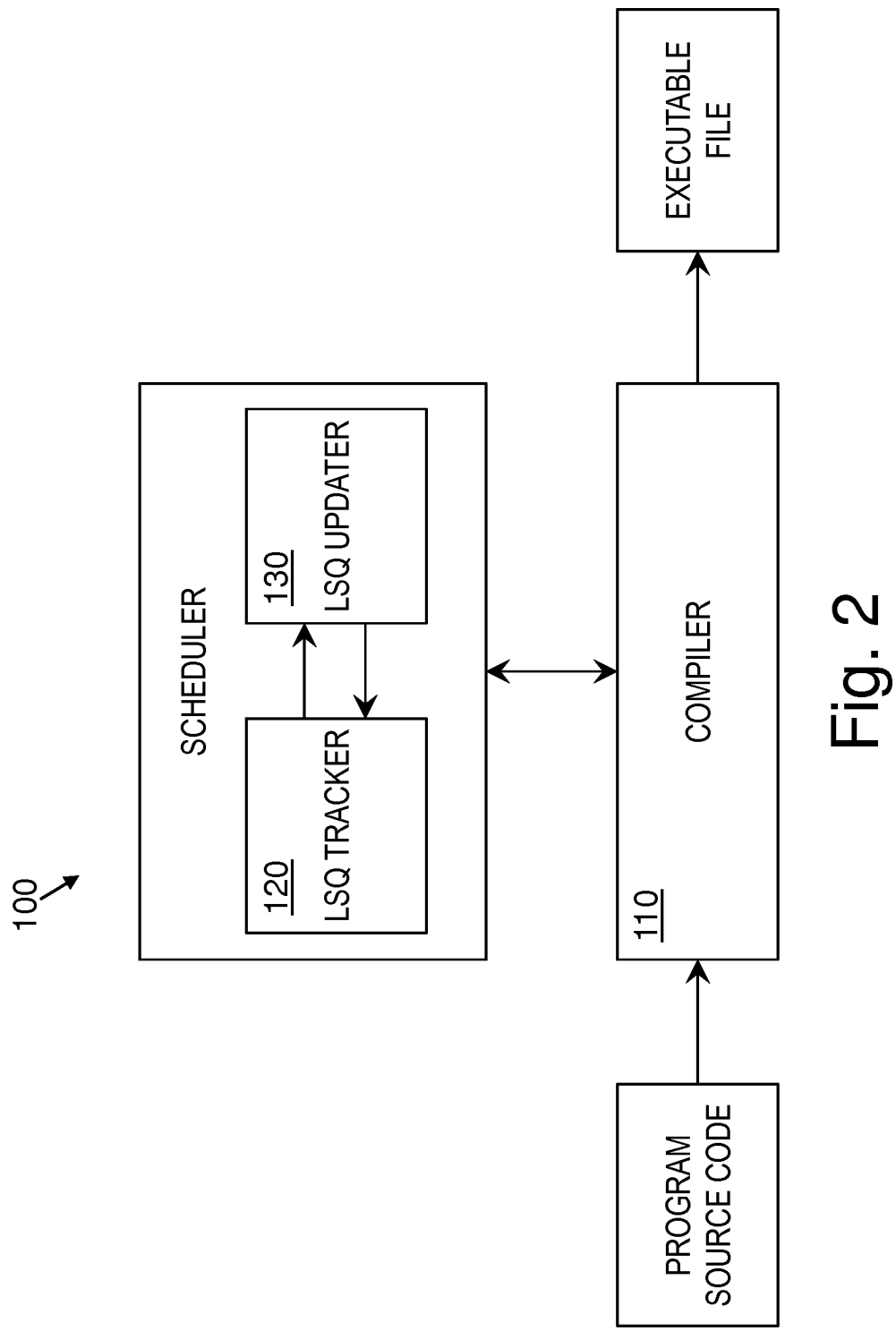
FIG. 2 is another block diagram of the scheduling system, according to some embodiments of this disclosure.

FIG. 2 is another block diagram of the scheduling system 100, according to some embodiments of this disclosure. As shown in FIG. 2, in contrast to FIG. 1, the scheduling system 100 need not be integrated into the compiler. While the scheduling system 100 may run at compile time, it may be sufficient to have the scheduling system 100 merely in communication with the compiler 100, rather than integrated into the compiler 100.

Figure 3:
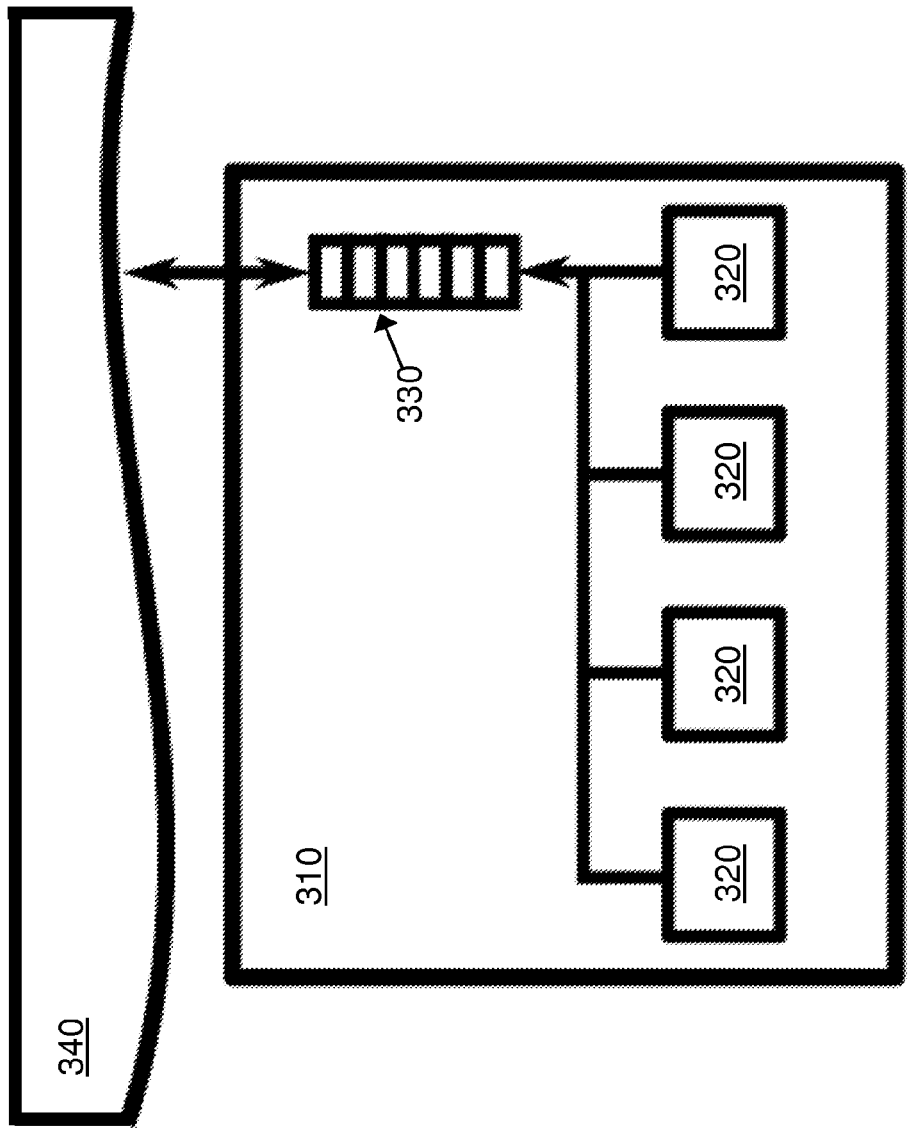
FIG. 3 is a block diagram of a processor configured to execute a program scheduled by the scheduling system, according to some embodiments of this disclosure.

FIG. 3 is a block diagram of a processor 310 configured to execute a program scheduled by the scheduling system 100, according to some embodiments of this disclosure. As shown, the processor 310 may have one or more processor cores 320 and an LSQ 330. The processor cores 320 may be in communication with the LSQ 330, such that memory access instructions from the processor cores 320 may be processed through the LSQ 330. The processor 310 may handle a memory access instruction on the LSQ 130 by retrieving data in a memory 340 and returning that retrieved data to the processor core 320 that issued the instruction. In some embodiments, the LSQ may be a first-in-first-out (FIFO) queue, such that memory access instructions are addressed in the order they are received at the LSQ 330. In general, the scheduling system 100 may schedule instructions by tracking the time-varying status of the LSQ 130 during compile time, such that processor stalls are reduced are minimized.

Throughout this disclosure, QC represents the LSQ capacity, which is the maximum number of memory access instructions that can be maintained in the LSQ 330 at a time. Through tracking of the LSQ 330, the scheduling system 100 may ensure that no more than QC memory access instructions are outstanding at any given time. Further, ISU represents an array of the time-varying size, or status, of the LSQ 330, which is the quantity of memory access instructions on the queue at a given time. More specifically, each item in the array ISU[t] represents the quantity of memory access instructions in the LSQ 330 at time t. The size of LSQ 330 is generally limited by the capacity of the LSQ 330, such that any memory access instruction that would increase the LSQ size to exceed the LSQ capacity may cause a processor stall.

To minimize the cost of tracking the LSQ 330, the program's execution may be divided into time windows, which may have a fixed size, such that each time window covers the same amount of time. In some embodiments, a time window may be defined based on cycles, such as processor cycles. For example, and not by way of limitation, each time window may cover a thousand cycles. Using time windows, the scheduling system 100 may avoid tracking the size of the LSQ 330 (i.e., the number of outstanding memory access instructions) at every single cycle, and may instead ensure that no more than QC memory access instructions are pending within each time window. As a result, the computational cost of the scheduling system 100 may be reduced dramatically, at the price of decreased fidelity, as compared to an embodiment that checks the current LSQ size at every cycle. As the time window decreases to as few as a single cycle in the extreme case, the fidelity increases along with the computational cost. Analogously, as the time window increases, the fidelity decreases along with the computational cost. Thus, the scheduling system 100 may select a time window size that provides a reasonable amount of fidelity for reasonable computational cost.

If the scheduling system 100 detects an overuse of the LSQ 330 (i.e., the number of memory access instructions issued and not completed exceeds the capacity QC of the LSQ 330), memory access instructions that would otherwise have been added to the LSQ 330 may be scheduled to a time window when space in the LSQ 330 is available. Scheduling a memory access request may include postponing it to a later time window than the time window currently being examined, or advancing it to a previous time window. Because the schedule of memory access instructions is determined by the scheduling system 100 at compile-time, it may be possible to not just postpone an instruction, but also to move it to an earlier point. During time windows when the LSQ 330 is full, the scheduling system 100 may schedule arithmetic instructions, which do not require use of the LSQ 330. In this manner, the processor 310 may perform useful work, which may avoid stalls, increase processor utilization, and improve overall program performance.

Suppose each instruction I has a length $S_I$, where the length of an instruction is the number of iterations or dynamic instances of the instruction that will be issued for execution. When an instruction begins issuing, all its iterations are issued consecutively. While the length $S_I$ of a memory access instruction might be 1, the length will typically be larger than 1 on a single instruction multiple data (SIMD) or vector architecture. Further, suppose a memory access instruction I has an estimated latency of $L_I$ cycles. Thus, if the instruction I is scheduled at time T, it may be estimated that the instruction will remain on the LSQ 330 from time T until time $T+S_I-1+L_I-1$.

The latency of memory access instructions may be variable. However, the scheduling system 100 may estimate the latency of the instruction I, and may use this estimated latency as the value of $L_I$. Various existing techniques may be used to estimate latency. These techniques may include, for example, one or more of: allowing a user to specify access latency of a memory data structure; estimating based on instruction type (e.g., update form instructions are more predictable than gather instructions); estimating based on access mechanism (e.g., sequential or random); estimating based on the memory address being accessed (e.g., instructions that access the local memory return faster than those that access remote memories); and estimating based on historical program execution traces.

To test the appropriateness of issuing an instruction I at a time T, the scheduling system 100 may determine whether the instruction I will cause an overuse of the LSQ 330 at any time window in the above time span of T through $T+S_I-1+L_I-1$. Example pseudocode representing this test of appropriateness, IsLSQFull( ), follows below, where a return value of True indicates that the LSQ 330 is too full to handle addition of the instruction I at time T.

```
IsLSQFull(Instruction I, Time T) {
    for (j = T, T + S_I - 1 + L_I - 1, step 1)
        if (ISU[j] + 1 > QC) return True
    return False
}
```

As shown in the pseudocode, the scheduling system 100 may determine whether, at any given time in the time span of T through $T+S_I-1+L_I-1$, the outstanding memory access instructions would exceed the capacity QC of the LSQ 330 if one additional instruction (i.e., the instruction I) were added to the LSQ 330. If adding this additional instruction would cause the number of outstanding memory access instructions (i.e., the LSQ size) to exceed the capacity of the LSQ 330, then the scheduling system 100 may determine that the LSQ 330 is too full to accept the instruction I at time T. Otherwise, the scheduling system 100 may determine that it would be appropriate to issue the instruction I at time T without overusing the LSQ 330.

When the scheduling system 100 identifies a suitable time T for issuing the instruction I, the scheduling system 100 may update the array ISU to indicate that an additional memory access request is included for the time span T through $T+S_I-1+L_I-1$. Example pseudocode for this updating is as follows:

```
UpdateLSQStatus(Instruction I, Time T) {
    for (j = T, T + S_I - 1 + L_I - 1, step 1)
        ISU[j] = ISU[j] + 1
}
```

When scheduling a particular instruction, the scheduling system 100 may consider only legal time windows for that instruction. Some instructions may depend on others having already been executed, and thus, an instruction may be legally scheduled only after its dependencies have been satisfied.

Determining which time windows are legal may be performed in various ways. For example, and not by way of limitation, for each time window T, the scheduling system 100 may have a work list of schedulable instructions from which it can choose a limited number to schedule at that time window, depending on the status of the LSQ 330. If there are no instructions in the work list or if the LSQ 330 is full at the time window, the scheduling system 100 may schedule no instructions at that time. As discussed above, the scheduling system may estimate that a memory access instruction added to the LSQ 330 at time T will leave the LSQ 330 at time $TE=T+S_I-1+L_I-1$. Thus, at the time window following TE, the scheduling system 100 may add to the work list instructions that depend on the completed instruction.

In some embodiments, to ensure the legality of instruction scheduling, the scheduling system 100 may track a time-varying set of schedulable instructions as well as the time-varying status of the LSQ 330. In some embodiments, this may be achieved by maintaining a schedulable array SB as well as the status array ISU. It will be understood, however, that other mechanisms for tracking schedulable instructions and the LSQ status may be used. In some embodiments, the schedulable array may store, for each time window T, a list of instructions that can be scheduled as early as that time window. As instructions are scheduled, both these arrays SB and ISU may be updated accordingly. The status array ISU may be updated to indicate, at each given time window, the current size of the LSQ 330. The schedulable array SB may be updated to include, in the first time window after the termination time of an instruction that was just scheduled, the instructions dependent on the instruction that was just scheduled.

In this example, for the sake of simplicity, the scheduling system 100 may step through the work list and attempt to schedule instructions in chronological order. However, it will be understood that the scheduling system 100 need not attempt to schedule instructions in chronological order. When the scheduling system 100 begins scheduling instructions in chronological order, it may do so by handling the instructions that are schedulable at the zeroth time window. At this time window, the scheduling system 100 may schedule any instructions currently in the schedulable list SB[0], which may be initialized to include only instructions that have no dependencies. The scheduling system 100 may select an instruction from this work list, identify an appropriate time window for the instruction, and schedule the instruction at that time window.

To identify an appropriate time window for an instruction, the scheduling system 100 may examine some or all time windows at which the instruction may be legally scheduled. From these time windows, the scheduling system 100 may determine one or more appropriate time windows for which, if the instruction were scheduled at that time window, the LSQ 330 would not be overused. In some embodiments, the scheduling system 100 may select the first time window identified as appropriate for each instruction, but it will be understood that other mechanisms may be used to determine which appropriate time window to select if more than one appropriate time window is identified. Example pseudocode for selecting a time window at which to schedule an instruction I follows below.

```
SelectTime(Memory Access Instruction I) {
    for (all legal time windows T) {
        If IsLSQFull(Instruction I, Time t) returns False {
            UpdateLSQStatus(Instruction I, Time t)
            break
        }
    }
}
```

If no time window T is deemed appropriate for adding a certain instruction in the work list to the LSQ 330, then the scheduling system 100 may schedule the instruction in any legal time window, for example, the time window with the lowest count of outstanding memory access instructions on the LSQ 330. It will be understood, however, that in this case, it is likely that instruction I will result in a processor stall.

After the termination time $TE=T+S_I-1+L_I-1$ of the newly scheduled instruction I, all instructions dependent on the scheduled instruction I (and not dependent on any instructions that have not yet terminated by time TE) may be added to the schedulable array at the first time window after TE. Thus, when the program time is broken into time windows of length w, these dependent instructions may be added to the schedulable array at $SB[ceiling((TE+1)/w)]$. In other words, these dependent instructions may become schedulable after the estimated completion of the newly scheduled instruction I.

The scheduling system 100 may schedule the remainder of the instructions in the zeroth time window's work list. It will be understood that, although a set of instructions are in the work list at the zeroth time window, not all of such instructions need be scheduled for issuance at the zeroth time window. Rather, some or all of these instructions may be scheduled for issuance at later time windows.

After scheduling the instructions in the zeroth time window's work list, the scheduling system 100 may move forward to address the work list of the first time window, which follows the zeroth time window. At the first time window, instructions in the schedulable list SB[1] may be added to the work list, because the dependencies of these instructions have been met. Once again, the scheduling system 100 may schedule the instructions in the work list, and may then advance to the work list of the next time window. It will be understood that the scheduling system 100 may continue stepping through the time windows until all memory access and arithmetic instructions are scheduled. Further, as needed, the scheduling system 100 may backtrack and modify the time window assignments of instructions in an attempt to optimize the resulting schedule.

The scheduling system 100 may schedule arithmetic instructions based on the fact that each processor core is capable of doing some work during each cycle. According to this disclosure, arithmetic instructions are instructions that do not require a memory access. For example, the data needed for an arithmetic instruction may already be in the applicable processor core's registers. In contrast to memory access instructions, the latency of arithmetic instruction is fixed. Based on the scheduling discussed above, it may be determined which processor cycles are used for performing memory access instructions. Simultaneously with scheduling memory access instructions, the scheduling system 100 may schedule arithmetic instructions as needed to cover each processor core's remaining processor cycles. Specifically, for example, arithmetic instructions may be scheduled to use processor cycles during time windows for which the LSQ 330 would become overused if a memory access instruction were to be scheduled.

After every instruction of a program's code has been scheduled, a compiler using the scheduling system 100 may generate code according to the resulting schedule. In some embodiments, this code may avoid or reduce processor stalls as compared to conventional schedulers.

Figure 4:
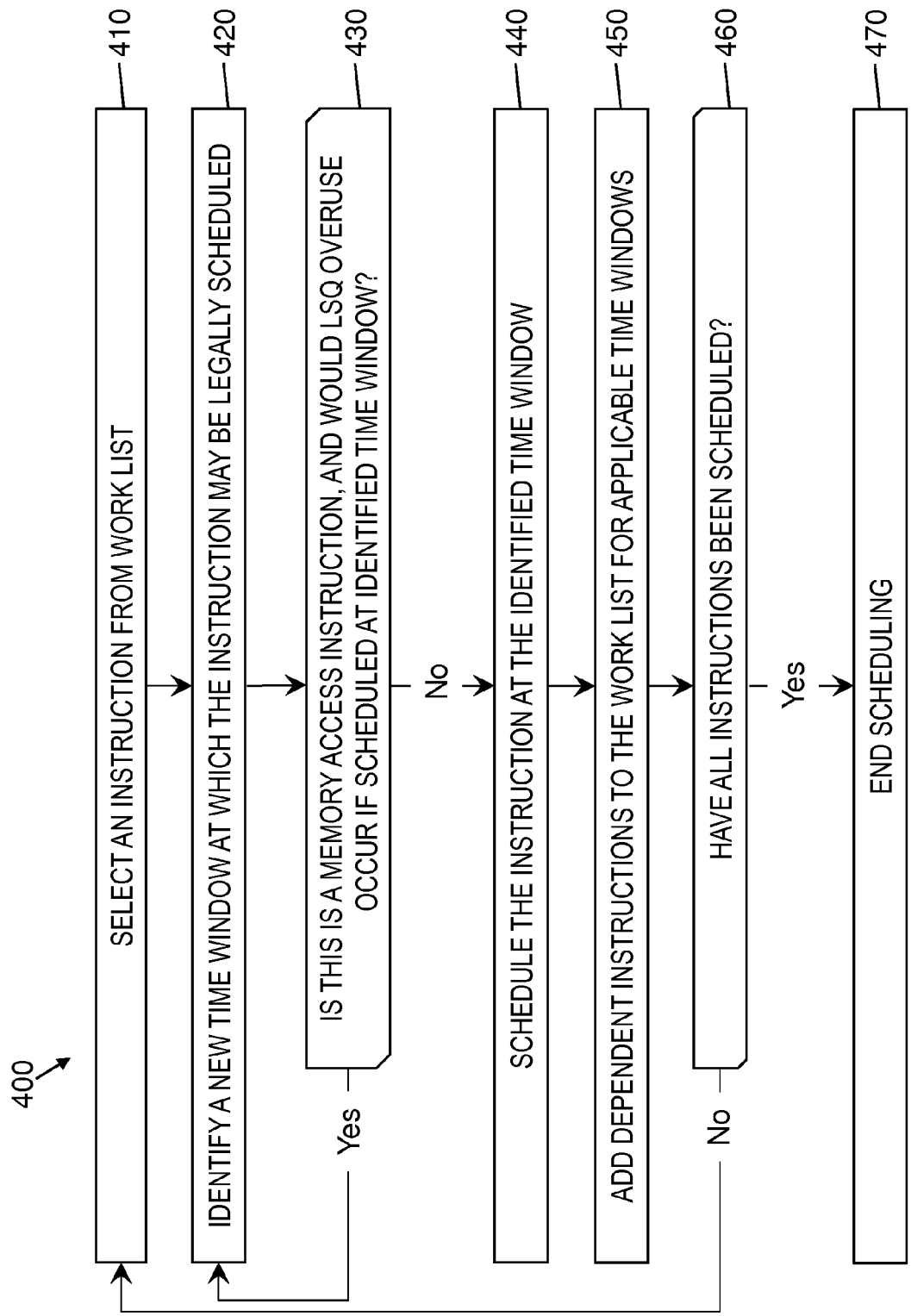
FIG. 4 is a flow diagram of a method for scheduling program instructions, according to some embodiments of this disclosure.

FIG. 4 is a flow diagram of a method 400 of scheduling instructions of a program, according to some embodiments of this disclosure. As shown, at block 410, an instruction may be selected from a work list. At block 420, the scheduling system 100 may identify a time window at which the selected memory access instruction may be legally scheduled. At decision block 430, if the instruction is a memory access instruction, the scheduling system 100 may determine whether scheduling the memory access instruction at that identified time window would lead to overuse of the LSQ 330. If overuse would occur, that time window may be deemed inappropriate for scheduling that instruction, and at block 420, the scheduling system 100 may choose another legal time window to evaluate for appropriateness. Instead, an arithmetic instruction, if available, may be scheduled at the time window that would have an overuse of the LSQ 330. If overuse would not occur, then at block 440, the scheduling system 100 may schedule the instruction at the chosen time window. At block 450, other instructions whose dependencies will be met by execution of the instruction may be added to the work list for scheduling in a time window after completed execution of the instruction. At decision block 460, the scheduling system 100 may determine whether all instructions have been scheduled. If not, another instruction may be selected from the work list at block 410. If all instructions have been scheduled, the scheduling system 100 may end the scheduling method 400 at block 470. It will be understood that many variations of this method 400 may be used, according to various embodiments of this disclosure.

Figure 5:
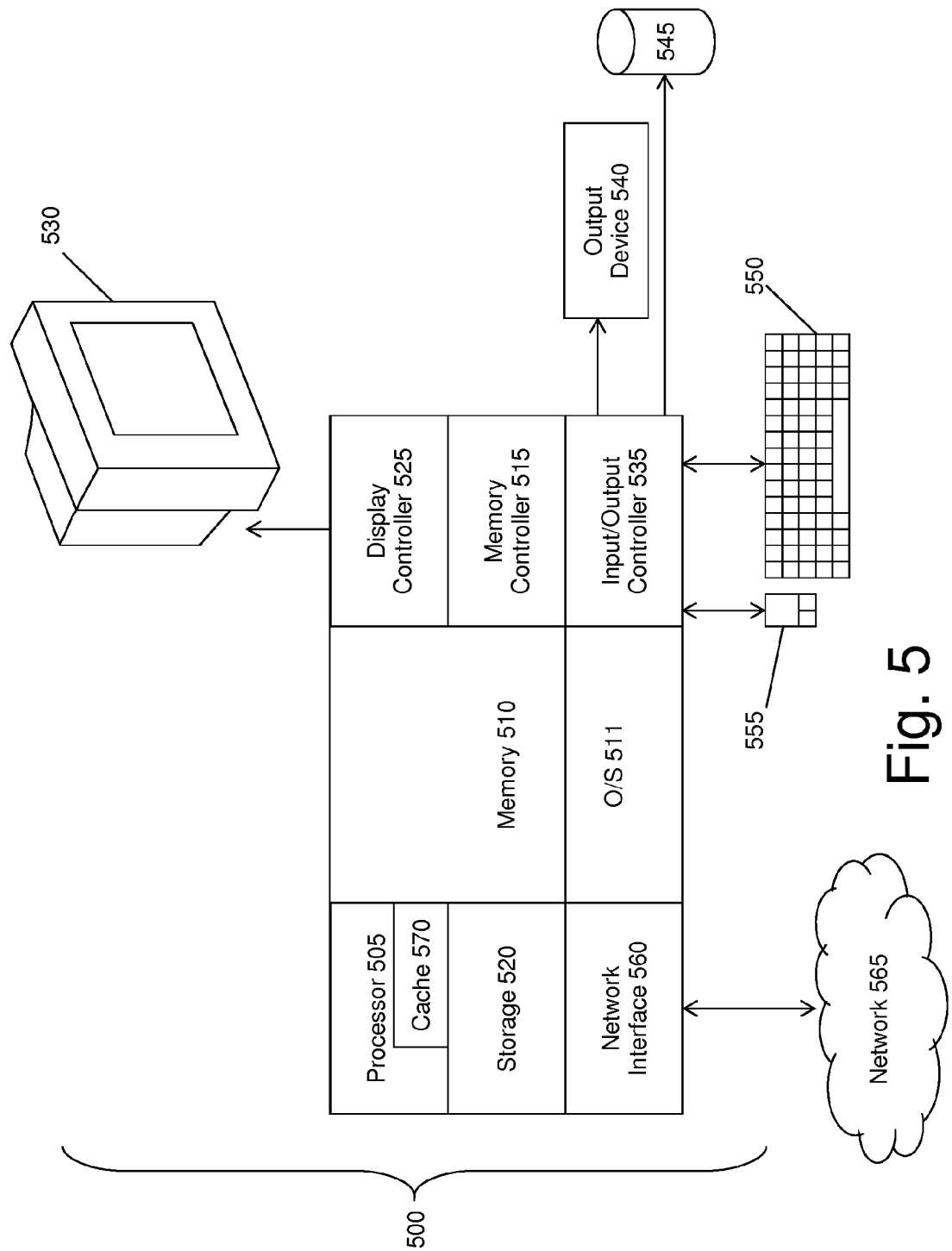
FIG. 5 is a block diagram of a computing device for implementing some or all aspects of the scheduling system, according to some embodiments of this disclosure.

FIG. 5 illustrates a block diagram of a computer system 500 for use in implementing a scheduling system or method according to some embodiments. The scheduling systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a personal computer, workstation, minicomputer, or mainframe computer.

In an exemplary embodiment, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the scheduling systems and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Scheduling systems and methods according to this disclosure may be embodied, in whole or in part, in computer program products or in computer systems 500, such as that illustrated in FIG. 5.

Technical effects and benefits of some embodiments include the ability to schedule instructions based on tracking the size of the LSQ 130, thereby reducing the number of stalls resulting from the LSQ 130 becoming full. Using conventional schedulers, compilers attempt to issue memory access instructions as soon as dependencies for those instructions are resolved, to enable covering as much of the memory latency as possible. However, there are processor microarchitectures in which this aggressive issue of memory access instructions can lead to performance degradation and processor stalls. Some embodiments of this disclosure can avoid such processor stalls.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    tracking a size of a load-store queue (LSQ) during compile time of a program, the size of the LSQ being time-varying and indicating how many memory access instructions of the program are on the LSQ; and
    scheduling, by a computer processor, into a plurality of time windows, a plurality of memory access instructions of the program, wherein the scheduling into each time window of the plurality of time windows is based on how many memory access instructions of the program are on the LSQ at the time window, and wherein the scheduling comprises:
        determining that the LSQ has reached a maximum number of memory access instructions at a first time window of the plurality of time windows;
        estimating a length for which a memory access instruction of the plurality of memory accesses will be on the LSQ;
        selecting a time at which to schedule the memory access instruction such that the size of the LSQ does not exceed the maximum number of memory access instructions throughout the length of the memory access instruction;
        wherein the selecting comprises identifying a different time than the first time window at which to schedule the memory access instruction, responsive to the LSQ having reached the maximum number of memory access instructions at the first time window, wherein the identifying comprises scheduling the memory access instruction at an earlier time than the first time window; and
        scheduling an arithmetic instruction at the first time window in addition to the maximum number of memory access instructions, responsive to determining that the LSQ has reached the maximum number of memory access instructions at the first time window.

2. The method of claim 1, wherein the estimating the length for which the memory access instruction of the plurality of memory accesses will be on the LSQ comprises estimating a latency of the memory access instruction.

3. The method of claim 1, wherein the estimating the length for which the memory access instruction of the plurality of memory accesses will be on the LSQ comprises determining how many iterations of the memory access instruction will be issued.

4. The method of claim 1, further comprising:
    dividing a running time of the program into a plurality of time windows, wherein each time window comprises two or more processor cycles;
    wherein the scheduling the plurality of memory access instructions of the program comprises ensuring the size of the LSQ does not exceed the maximum number of memory access instructions in each time window of the plurality of time windows.

* * * * *